US007388496B1

(12) United States Patent
Halcrow et al.

(10) Patent No.: US 7,388,496 B1
(45) Date of Patent: Jun. 17, 2008

(54) SYSTEM FOR ARCHIVING SCENE PROPS

(75) Inventors: Michael A. Halcrow, Pflugerville, TX (US); Dustin Kirkland, Austin, TX (US); Ameet M. Paranjape, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/871,424

(22) Filed: Oct. 12, 2007

(51) Int. Cl.
*G08B 13/14* (2006.01)
(52) U.S. Cl. ...................................... 340/572.1; 705/14
(58) Field of Classification Search .............. 340/572.1; 348/239; 725/60, 115, 145; 705/7, 10, 14
See application file for complete search history.

(56) References Cited

U.S. PATENT DOCUMENTS

| 5,936,527 | A | * | 8/1999 | Isaacman et al. | ......... | 340/572.1 |
| 5,957,695 | A | * | 9/1999 | Redford et al. | ............... | 705/14 |
| 7,151,454 | B2 | | 12/2006 | Washington | | |
| 2002/0042741 | A1 | * | 4/2002 | Wilson et al. | ................ | 705/14 |
| 2002/0087402 | A1 | * | 7/2002 | Zustak et al. | ................ | 705/14 |
| 2004/0164858 | A1 | | 8/2004 | Lin | | |
| 2005/0229227 | A1 | | 10/2005 | Rogers | | |
| 2006/0253330 | A1 | * | 11/2006 | Maggio et al. | ............... | 705/14 |

* cited by examiner

*Primary Examiner*—John A Tweel, Jr.
(74) *Attorney, Agent, or Firm*—Cantor Colburn LLP; Libby Handelsman

(57) ABSTRACT

A system for identifying product placement props in a scene, the system includes: one or more cameras individually equipped with radio frequency identification (RFID) readers for filming or recording a scene for audio/video (A/V) content; one or more product placement props each having an RFID tag affixed thereon representing product placements within the scene; wherein the RFID readers interrogate the RFID tags to determine product placement prop related information including: which of the one or more product placement props are in the scene, and the one or more product placement props relative location with respect to the one or more cameras; and one or more recording devices for retaining the A/V content and the product placement prop related information.

3 Claims, 1 Drawing Sheet

SYSTEM FOR ARCHIVING SCENE PROPS

BACKGROUND OF THE INVENTION

1. Field of the Invention

The present invention relates generally to product placement, and more particularly, to a system for identifying product placement props in a scene with one or more cameras equipped with radio frequency identification (RFID) readers.

2. Description of the Related Art

The proliferation of recording devices and the downloading of audio/video (A/V) content from the Internet in the home has become an increasing concern for advertising and programming executives. The ability to record a program for later viewing, generally allows the viewer to skip or eliminate commercial breaks. The elimination of commercials acts as a disincentive for advertisers to place televised advertisements, and lowers fees paid to programmers. In an effort to get advertised products noticed by viewers, who either skip or tune out commercials, advertisers are increasingly relying on product placement in the backgrounds of various scenes in television programming and feature films. However, as the number of product placements increase, advertisers are requiring improved feedback about the airtime their products are receiving, and if a particular product placement was effective.

SUMMARY OF THE INVENTION

Embodiments of the present invention include a system for identifying product placement props in a scene, the system includes: one or more cameras individually equipped with radio frequency identification (RFID) readers for filming or recording a scene for audio/video (A/V) content; one or more product placement props each having an RFID tag affixed thereon representing product placements within the scene; wherein the RFID readers interrogate the RFID tags to determine product placement prop related information including: which of the one or more product placement props are in the scene, and the one or more product placement props relative location with respect to the one or more cameras; and one or more recording devices for retaining the A/V content and the product placement prop related information.

Technical Effects

As a result of the summarized invention, a solution is technically achieved for a system for identifying product placement props in a scene with one or more cameras equipped with radio frequency identification (RFID) readers.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
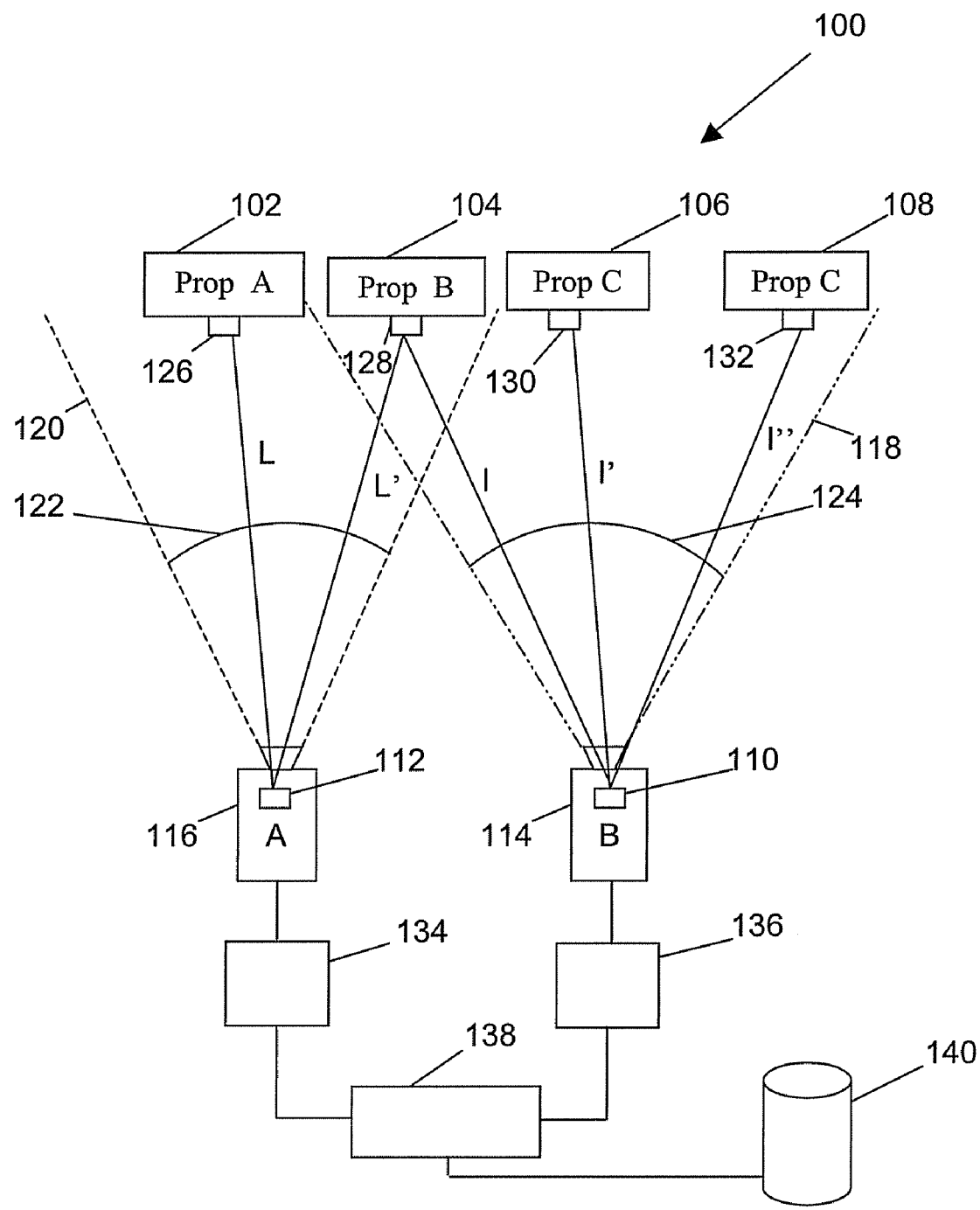
FIG. 1 is a block diagram of an exemplary system for implementing embodiments of the invention.

The detailed description explains the preferred embodiments of the invention, together with advantages and features, by way of example with reference to the drawings.

DETAILED DESCRIPTION

Embodiments of the invention provide a system for identifying product placement props in a scene with one or more cameras equipped with radio frequency identification (RFID) readers. The product placement props are fitted with RFID tags (hereafter referred to as "RFIDed props") prior to filming or taping of a scene with the one or more cameras equipped with the RFID readers. RFIDed props within the camera's range and a specified viewing angle have data associated with the individual prop's RFID tag recorded on an information track along with the recorded A/V content. The recorded data associated with the RFIDed props may be used to identify when and for how long a certain product placement is on a viewer's screen. The recorded data may be put into a searchable database based on product name, scenes in which the product is present, the position of the product placement within the scene, and the amount of time a product is in view.

Programmers to establish advertising fees to be paid by the product sponsors may use the searchable database of embodiments of the invention. Advertising fees may be established based on the amount of screen time of the product, and the product's position on the screen. For example, if the center of a camera shot were determined to be the prime location for a product placement, the distance from the center of the scene of the product placement would be considered in determining the advertising fee. The timing of return signals emanating from the RFID tags, based on an interrogation signal from an RFID reader, may be used in determining the position of the RFIDed props, with props located further away from the center of the screen shot taking longer to respond to the RFID reader.

FIG. 1 is a block diagram of an exemplary system 100 for implementing embodiments of the invention. The system 100 may be implemented in a production studio or outdoors. In the example system 100, there are cameras A 116 and camera B 114 that are equipped with RFID readers 112 and 110, respectively. Camera A 116 has a maximum viewing field defined by the arc 122 and dotted lines 120, while camera B 114 has a maximum viewing field defined by arc 124 and dotted lines 118. A series of product placement props (Prop A 102, Prop B 104, Prop C 106, Prop D 108) with affixed RFID tags (126, 128, 130, 132, respectively) are placed in a scene to be filmed and recorded.

In the exemplary system 100 cameras A 116 and camera B 114 are both used during the filming of the scene for a movie or A/V program. The series of props (102, 104, 106, 108) are positioned at varying distances from the camera A 116 and camera B 114. For example, prop A 102 is a distance L from camera A 116, while prop B 104 is a further distance L' (L'>L) from camera A 116. In the example, prop A 102 is out of the vision field of camera B 114. The distances between the cameras (114, 116) and the props (102, 104, 106, 108), are determined by the interaction of the RFID readers (110, 112) and the props (102, 104, 106, 108), that are within the vision field of the respective cameras (114, 116) that the RFID readers (110, 112) are affixed to.

For example, RFID reader 112 sends out an interrogation signal to prop A 102 and prop B 104 that are within the vision field of camera A 116. The variable delay in receiving the acknowledgement signals from prop A 102 and prop B 104 is used to determine the prop distances from the camera A 116. In the present example, prop B 104 is further (L') from the camera, and the acknowledgement signal from RFID tag 128 will have a greater delay than that of RFID tag 126 affixed to prop A 102 at the shorter distance (L). The relative positional information of the props (102, 104, 106, 108) is recorded in synch with the A/V content in recorders 134 and 136 to form program footage. Editing machine 138 is utilized to combine the program footage from recorders 134 and 136. During editing, the relative positional information for the props (102, 104, 106, 108) is retained based on the camera angle utilized during each segment of the scene shot.

The recorded relative positional information for the props (102, 104, 106, 108) may then be utilized in a searchable database 140 that may be queried based on product name, scenes in which the product is present, the position of the product placement within the scene, and the amount of time a product is in view.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for identifying product placement props in a scene, the system comprising:

one or more cameras, individually equipped with radio frequency identification (RFID) readers, for filming or recording a scene for audio/video (A/V) content;

one or more product placement props each having an RFID tag affixed thereon representing product placements within the scene;

wherein the RFID readers interrogate the RFID tags to determine product placement prop related information including: which of the one or more product placement props are in the scene, and the relative location of one or more product placement props with respect to the one or more cameras;

wherein the RFID tags interrogated by each of the RFID readers are determined in response to a vision field of the one or more cameras;

wherein the vision field of the one or more cameras is defined as a range and specified viewing angle of each of the one or more cameras;

wherein the RFID tags affixed to the one or more product placement props outside the vision field of the one or more cameras are not interrogated;

wherein the relative positional information of the one or more product placement props to the one or more cameras is determined by a level of delay in receiving a response from an interrogated RFID tag at individual RFID readers;

one or more recording devices for retaining Audio/Visual content and product placement prop related information;

wherein the Audio/Visual content is synchronized with the product placement prop related information to form program footage; and wherein combined program footage retains the product placement prop related information.

2. The system of claim 1, wherein recorded relative positional information for the product placement props is utilized in a searchable database that can be queried based on product name, scenes in which the product placement prop is present, the position of the product placement prop within the scene, and the amount of time a product placement prop is in view.

3. The system of claim 2, wherein the searchable database is utilized to determine advertising fees;

wherein the advertising fees are determined based on amount of screen time for the product placement prop and position of the product placement prop on the screen.

* * * * *